United States Patent
Grossi et al.

(10) Patent No.: US 6,427,854 B1
(45) Date of Patent: Aug. 6, 2002

(54) BAG AND BICYCLE RACK

(76) Inventors: Claude Grossi, P.O. Box 68 Essendon, Melbourne, Victoria 3040; Robert Assaf, 23 Epsom Avenue Epping, Melbourne, Victoria 3076; Patrick Bucca, 7 Macka Avenue Greensborough, Melbourne, Victoria 3088; Paul Grossi, 34 Alcock Street Resevoir, Melbourne, Victoria 3073, all of (AU)

( * ) Notice: Subject to any disclaimer, the term of this patent is extended or adjusted under 35 U.S.C. 154(b) by 0 days.

(21) Appl. No.: 09/574,521

(22) Filed: May 19, 2000

(51) Int. Cl.[7] ............................. A47F 7/00; B60R 9/00
(52) U.S. Cl. .................. 211/85.7; 224/521; 224/502; 224/505
(58) Field of Search ................... 211/85.7, 87.01, 211/17, 22, 24, 20; 224/521, 502, 505

(56) References Cited

U.S. PATENT DOCUMENTS

| | | | | |
|---|---|---|---|---|
| 596,541 A | * | 1/1898 | Price | 211/22 |
| 2,432,732 A | | 12/1947 | Del Cano | |
| 3,675,784 A | * | 7/1972 | John | 211/22 |
| 3,941,406 A | * | 3/1976 | Eggleston | 280/400 |
| 4,299,341 A | | 11/1981 | Copeland | |
| 4,337,882 A | * | 7/1982 | Hampton | 224/42.03 R |
| 4,461,410 A | | 7/1984 | Tartaglia | |
| 4,533,013 A | * | 8/1985 | Hightower | 180/210 |
| 4,676,414 A | | 6/1987 | Deguevara | |
| 4,823,997 A | * | 4/1989 | Krieger | 224/42.03 B |
| D314,543 S | | 2/1991 | Ott et al. | |
| 5,094,373 A | * | 3/1992 | Lovci | 224/42.08 |
| 5,129,559 A | * | 7/1992 | Holliday | 224/42.03 B |
| 5,190,195 A | * | 3/1993 | Fullhart et al. | 224/42.03 B |
| 5,219,105 A | * | 6/1993 | Kravitz | 224/42.03 B |
| 5,232,133 A | * | 8/1993 | Speer | 224/42.001 |
| 5,351,983 A | * | 10/1994 | Descalo | 280/646 |
| 5,443,189 A | * | 8/1995 | Hirschfeld | 224/501 |
| 5,469,997 A | * | 11/1995 | Carlson | 224/521 |
| 5,527,146 A | * | 6/1996 | Allsop et al. | 414/462 |
| 5,579,972 A | * | 12/1996 | Despain | 224/506 |
| 5,615,904 A | * | 4/1997 | Van Dusen et al. | 280/506 |
| 5,641,108 A | * | 6/1997 | Ewer | 224/536 |
| 5,664,717 A | * | 9/1997 | Joder | 224/502 |
| 5,730,345 A | | 3/1998 | Yeckley et al. | |
| 5,803,330 A | * | 9/1998 | Stack et al. | 224/518 |
| 5,806,738 A | * | 9/1998 | D'Angelo | 224/521 |
| 5,941,542 A | * | 8/1999 | Kalman | 280/38 |
| 6,019,266 A | * | 2/2000 | Johnson | 224/534 |
| 6,039,227 A | * | 3/2000 | Stark | 224/521 |
| 6,123,498 A | * | 9/2000 | Surkin | 414/462 |
| 6,126,050 A | * | 10/2000 | Aliano, Jr. | 224/274 |
| D437,578 S | * | 2/2001 | Stannard-Warne | D12/406 |
| 6,217,053 B1 | * | 4/2001 | Forsythe et al. | 280/414.3 |

* cited by examiner

*Primary Examiner*—Daniel P. Stodola
*Assistant Examiner*—Khoa Tran

(57) ABSTRACT

A bag and bicycle rack for easily mounting upon a vehicle and for conveniently stowing golf bags and bicycles and saving other space in the vehicle. The bag and bicycle rack includes a hitch mounting member for mounting upon a hitch of a vehicle, a pair of brace members and an elongate upright support member which is secured to the brace members and secured upon the hitch mounting member. Two bracket members are securely attached with conventional means to the brace members and one bracket is securely and conventionally attached to the elongate upright support member. Three bag support members are securely and conventionally mounted to the bracket members. A cantilevered support member is removeably mounted upon the elongate upright support member and secured to the elongate upright support member with a retainer member. Two support bracket members are securely mounted to the cantilevered support member with a lever hingedly attached to the cantilevered support member for opening and closing over the two support bracket members.

12 Claims, 2 Drawing Sheets

BAG AND BICYCLE RACK

BACKGROUND OF THE INVENTION

1. Field of the Invention

The present invention relates to a vehicle rack for storing golf bags and bicycles and more particularly pertains to a new bag and bicycle rack for easily mounting upon a vehicle and for conveniently stowing golf bags and bicycles and saving other space in the vehicle.

2. Description of the Prior Art

The use of a vehicle rack for storing golf bags and bicycles is known in the prior art. More specifically, a vehicle rack for storing golf bags and bicycles heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,730,345; 4,461,410; 4,676,414; 4,299,341; 2,432,732; and U.S. Pat. No. Des. 314,543.

While these devices fulfill their respective, particular objectives and requirements, the aforementioned patents do not disclose a new bag and bicycle rack. The inventive device includes a hitch mounting member for mounting upon a hitch of a vehicle, a pair of brace members and an elongate upright support member which is secured to the brace members and secured upon the hitch mounting member. Two bracket members are securely attached with conventional means to the brace members and one bracket is securely and conventionally attached to the elongate upright support member. Three bag support members are securely and conventionally mounted to the bracket members. A cantilevered support member is removeably mounted upon the elongate upright support member and secured to the elongate upright support member with a retainer member. Two support bracket members are securely mounted to the cantilevered support member with a lever hingedly attached to the cantilevered support member for opening and closing over the two support bracket members.

In these respects, the bag and bicycle rack according to the present invention substantially departs from the conventional concepts and designs of the prior art, and in so doing provides an apparatus primarily developed for the purpose of easily mounting upon a vehicle and for conveniently stowing golf bags and bicycles and saving other space in the vehicle.

SUMMARY OF THE INVENTION

In view of the foregoing disadvantages inherent in the known types of a vehicle rack for storing golf bags and bicycles now present in the prior art, the present invention provides a new bag and bicycle rack construction wherein the same can be utilized for easily mounting upon a vehicle and for conveniently stowing golf bags and bicycles and saving other space in the vehicle.

The general purpose of the present invention, which will be described subsequently in greater detail, is to provide a new bag and bicycle rack apparatus and method which has many of the advantages of the a vehicle rack for storing golf bags and bicycles mentioned heretofore and many novel features that result in a new bag and bicycle rack which is not anticipated, rendered obvious, suggested, or even implied by any of the prior art a vehicle rack for storing golf bags and bicycles, either alone or in any combination thereof.

To attain this, the present invention generally comprises a hitch mounting member for mounting upon a hitch of a vehicle, a pair of brace members and an elongate upright support member which is secured to the brace members and secured upon the hitch mounting member. Two bracket members are securely attached with conventional means to the brace members and one bracket is securely and conventionally attached to the elongate upright support member. Three bag support members are securely and conventionally mounted to the bracket members. A cantilevered support member is removeably mounted upon the elongate upright support member and secured to the elongate upright support member with a retainer member. Two support bracket members are securely mounted to the cantilevered support member with a lever hingedly attached to the cantilevered support member for opening and closing over the two support bracket members.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new bag and bicycle rack apparatus and method which has many of the advantages of the a vehicle rack for storing golf bags and bicycles mentioned heretofore and many novel features that result in a new bag and bicycle rack which is not anticipated, rendered obvious, suggested, or even implied by any of the prior art a vehicle rack for storing golf bags and bicycles, either alone or in any combination thereof.

It is another object of the present invention to provide a new bag and bicycle rack which may be easily and efficiently manufactured and marketed.

It is a further object of the present invention to provide a new bag and bicycle rack which is of a durable and reliable construction.

An even further object of the present invention is to provide a new bag and bicycle rack which is susceptible of a low cost of manufacture with regard to both materials and labor, and which accordingly is then susceptible of low prices of sale to the consuming public, thereby making such bag and bicycle rack economically available to the buying public.

Still yet another object of the present invention is to provide a new bag and bicycle rack which provides in the apparatuses and methods of the prior art some of the advantages thereof, while simultaneously overcoming some of the disadvantages normally associated therewith.

Still another object of the present invention is to provide a new bag and bicycle rack for easily mounting upon a vehicle and for conveniently stowing golf bags and bicycles and saving other space in the vehicle.

Yet another object of the present invention is to provide a new bag and bicycle rack which includes a hitch mounting member for mounting upon a hitch of a vehicle, a pair of brace members and an elongate upright support member which is secured to the brace members and secured upon the hitch mounting member. Two bracket members are securely attached with conventional means to the brace members and one bracket is securely and conventionally attached to the elongate upright support member. Three bag support members are securely and conventionally mounted to the bracket members. A cantilevered support member is removeably mounted upon the elongate upright support member and secured to the elongate upright support member with a retainer member. Two support bracket members are securely mounted to the cantilevered support member with a lever hingedly attached to the cantilevered support member for opening and closing over the two support bracket members.

Still yet another object of the present invention is to provide a new bag and bicycle rack that gives the user more space to store items in a vehicle.

Even still another object of the present invention is to provide a new bag and bicycle rack that conveniently and easily stores golf club bags and bicycles at the rear of a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
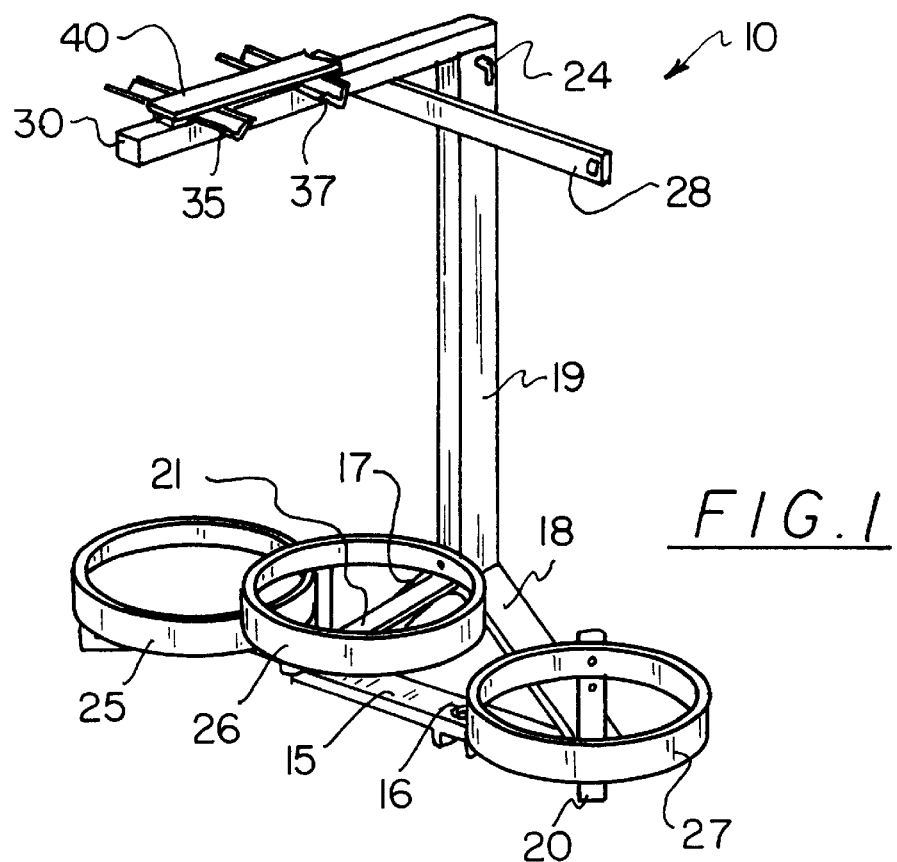
FIG. 1 is a perspective view of a new bag and bicycle rack according to the present invention.
Figure 2:
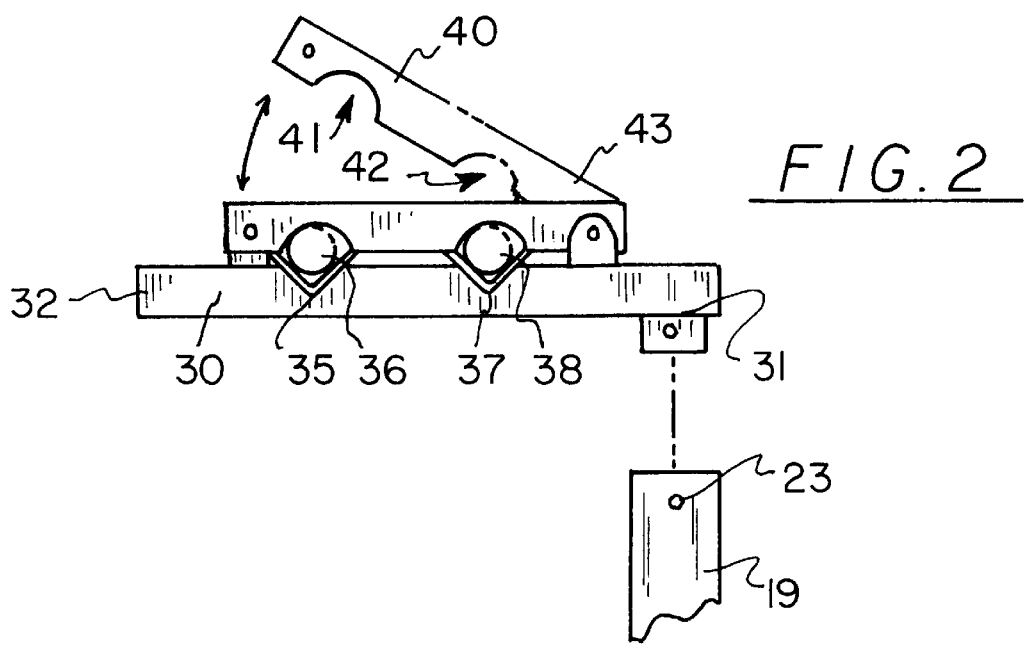
FIG. 2 is a frontal elevational view of the present invention.
Figure 3:
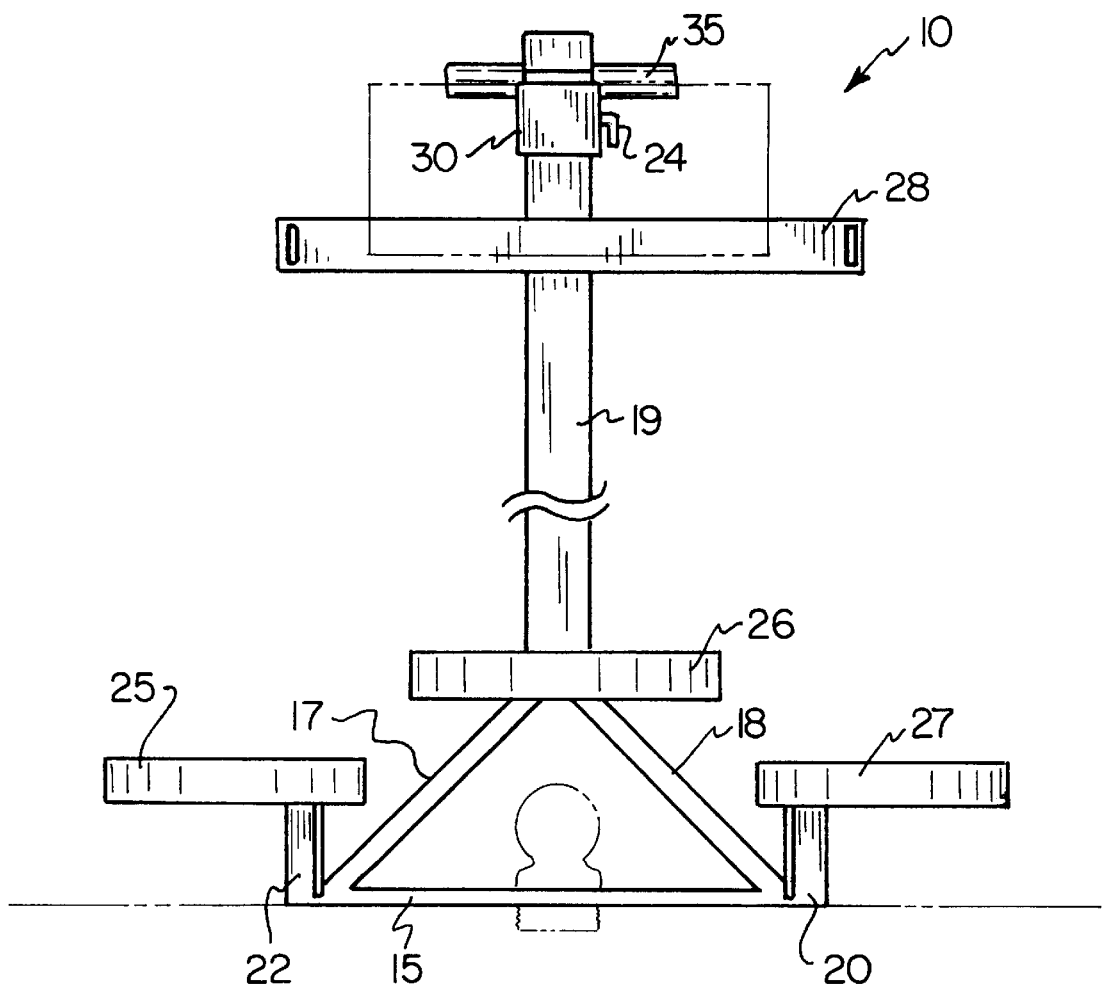
FIG. 3 is a detailed side view of the means to support a bicycle of the present invention.

With reference now to the drawings, and in particular to FIGS. 1 through 3 thereof, a new bag and bicycle rack embodying the principles and concepts of the present invention and generally designated by the reference numeral 10 will be described. As best illustrated in FIGS. 1 through 3, the bag and bicycle rack 10 generally comprises a base means including a hitch mounting member 15 for removeably mounting upon a hitch of a vehicle, a pair of brace members 17,18 securely and conventionally attached to the hitch mounting member 15, an elongate upright support member 19 securely and conventionally attached to the brace members 17,18 and having a bottom end and a top end and a hole 23 near the top end. The hitch mounting member 15 is generally elongate and has a opening 16 therethrough, the opening 16 being dimensioned to receive a hitch therethrough. The hitch mounting member 15 is also generally horizontally-disposed. Each of the brace members 17,18 has a first end which is securely attached to the hitch mounting member 15 and has a second end which is securely attached to the elongate upright support member 19. Each of the second ends of the brace members 17,18 is securely and conventionally attached to the bottom end of the elongate upright support member 19.

The bag and bicycle rack also includes a plurality of bracket members 20–22 securely and conventionally attached to the base means, and a plurality of bag support members 25–27 each of which is securely and conventionally attached to a respective one of the bracket members 20–22 with each of the bag support members 25–27 being essentially a ring which is generally horizontally-disposed.

In addition, the bag and bicycle rack includes a cantilevered support member 30 having a first end 31 which is removeably and securely mounted with a retainer member 24 upon the top end of the elongate upright member 19. Two elongate support bracket members 35,37 are securely and perpendicularly attached to near a second end 32 of the cantilevered support member 30. A lever 40 has an end 43 hingedly attached to the cantilevered support member 30 and is capable of closing upon the elongate support bracket members 35,37. The lever 40 has two slots 41,42 in a bottom thereof. The elongate support bracket members 35,37 each having a groove 36,38 in a top thereof. The slots 41,42 in the lever 40 and the grooves 36,38 in the elongate support bracket members 35,37 are essentially vertically aligned when the lever 40 is closed upon the elongate support bracket members 35,37. A cross member 28 for retaining bags and bicycles upon the rack 10 is securely and conventionally secured to near the top end of the elongate upright support member 19.

In use, a user would place a bottom of bag such as a golf bag on one of the rings 25–27 and use straps for tying the golf bag to the cross member 28, and can mount a bicycle to the rack 10 by putting the cross bar of the bicycle upon one of the elongate support bracket members 35,37 and tying the bicycle to the cross member 28 with a flexible strap.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A golf bag and bicycle supporting rack for mounting on a hitch of a vehicle, said rack comprising:
   a base for removably mounting upon a hitch, said base having an opening therein for receiving a bolt mounting portion of a hitch ball assembly;
   a bag support means for supporting golf bags, said bag support means being mounted on said base; and
   a bicycle support means for supporting bicycles, said bicycle support means being removably mounted on said base;
   wherein said bag support means comprises a lower bag support assembly and an upper bag support assembly, said lower bag support assembly comprising a pair of side lower bag support assemblies, said upper bag support assembly being positioned between said pair of side lower bag support assemblies.

2. The rack of claim 1 wherein said base comprises an upright support member having an upper end and a lower end.

3. The rack of claim 2 wherein said bicycle support means comprises a cantilevered support member having a first end removably mounted on said upper end of said upright support member, said cantilevered support member extending from said upright support member.

4. The rack of claim 3 wherein said bicycle support means comprises at least one elongate support bracket member mounted on said support member in a substantially perpendicular relationship to said cantilevered support member, said at least one support bracket comprising a groove opening upwardly for resting a bar of a bicycle thereon.

5. The rack of claim 4 wherein said bicycle support means comprises a lever having an end pivotally mounted on said cantilevered support member for closing upon said at least one elongate support bracket member, said lever having a slot alignable with the groove of said at least one support member.

6. The rack of claim 5 wherein said bicycle support means comprises a retainer member insertable through a hole in said elongate upright support member and through a hole in said first end of said cantilevered support member to secure said cantilevered support member to said elongate upright support member.

7. The rack of claim 2 wherein said base comprises a hitch mounting member extending transversely to the upright support member and being connected to the lower end of said upright support member, the opening of said base being formed in said hitch mounting member.

8. The rack of claim 7 wherein said base comprises a pair of brace members extending between said hitch mounting member and said upright support member, said brace members having upper ends connected together and to the lower end of said upright support member, said brace members having lower ends mounted to laterally separated locations on said hitch mounting member.

9. The rack of claim 2 wherein said bicycle support means is located toward the upper end of said upright support member.

10. The rack of claim 1 wherein said lower bag support assembly is mounted on said base, said lower bag support assembly extending from said base.

11. The rack of claim 1 wherein said lower bag support assembly comprises:
    a hoop extending from said base; and
    a support strap extending across said hoop such that a lower end of a bag inserted into said hoop is prevented from passing through said hoop.

12. The rack of claim 1 wherein said upper bag support assembly is mounted at a location above said lower bag support.

* * * * *